United States Patent
Fang

(10) Patent No.: US 8,310,348 B2
(45) Date of Patent: Nov. 13, 2012

(54) REMOTE CONTROLLING SYSTEM FOR CONTROLLING ELECTRONIC EQUIPMENTS WITHIN SITUATION

(75) Inventor: Jui-Kuang Fang, Taipei (TW)

(73) Assignee: Livinglab Development Co., Ltd., Taipei (TW)

( * ) Notice: Subject to any disclaimer, the term of this patent is extended or adjusted under 35 U.S.C. 154(b) by 1588 days.

(21) Appl. No.: 11/594,181

(22) Filed: Nov. 8, 2006

(65) Prior Publication Data

US 2008/0084280 A1    Apr. 10, 2008

(30) Foreign Application Priority Data

Sep. 1, 2006 (TW) .................. 95132482 A

(51) Int. Cl.
G08C 19/16 (2006.01)
G05B 11/01 (2006.01)

(52) U.S. Cl. ............ 340/12.5; 340/13.24; 340/5.1; 340/5.61; 455/16

(58) Field of Classification Search ......... 340/825.69, 340/825.72, 5.1, 5.5, 5.61, 12.5, 12.51–12.55, 340/13.24; 455/16, 41, 419; 379/110.01, 379/90.01; 341/176; 709/229
See application file for complete search history.

(56) References Cited

U.S. PATENT DOCUMENTS

| | | | | |
|---|---|---|---|---|
| 5,631,652 A * | 5/1997 | Lee | ................. | 341/176 |
| 5,963,624 A * | 10/1999 | Pope | ................. | 379/110.01 |
| 6,469,633 B1 * | 10/2002 | Wachter | ............. | 340/825.69 |
| 6,694,125 B2 * | 2/2004 | White et al. | .......... | 455/16 |
| 6,731,201 B1 * | 5/2004 | Bailey et al. | ......... | 340/310.11 |
| 6,748,278 B1 * | 6/2004 | Maymudes | ........... | 700/17 |
| 6,774,813 B2 * | 8/2004 | van Ee et al. | ......... | 340/825.69 |
| 6,891,838 B1 * | 5/2005 | Petite et al. | .......... | 370/401 |
| 6,930,661 B2 * | 8/2005 | Uchida et al. | ......... | 345/87 |
| 6,998,955 B2 * | 2/2006 | Ballew et al. | ......... | 340/5.1 |
| 7,631,062 B2 * | 12/2009 | Motoyama | ........... | 709/223 |
| 8,232,861 B2 * | 7/2012 | Tsou | ................. | 340/5.25 |
| 2003/0195969 A1 * | 10/2003 | Neuman | ............. | 709/229 |

FOREIGN PATENT DOCUMENTS

| | | |
|---|---|---|
| TW | 200501662 | 1/2005 |
| TW | 200522555 | 7/2005 |

* cited by examiner

Primary Examiner — Nam V Nguyen

(57) ABSTRACT

The invention provides a remote controlling system for controlling a plurality of electronic equipments disposed within a situation, such as a home, a classroom, an office . . . etc. By use of the remote controlling system, a user can conveniently control the electronic equipments in the situation through a user interface or an external communication network such as a radio telecommunication network.

5 Claims, 2 Drawing Sheets

| Command | Instruction | Description |
|---------|-------------|-------------|
| 001 | 000001 | Turn on the TV |
| ⋮ | ⋮ | ⋮ |
| 701 | 100001 | Turn on the air conditioner |
| 702 | 100010 | Turn off the light |

FIG. 2

REMOTE CONTROLLING SYSTEM FOR CONTROLLING ELECTRONIC EQUIPMENTS WITHIN SITUATION

BACKGROUND OF THE INVENTION

1. Field of the Invention

The present invention relates to a remote controlling system for controlling multiple electronic equipments within a situation (such as home, classroom, office . . . etc.). Particularly, the present invention relates to a remote controlling system using radiation-based signal control (such as infrared remote control) for users to conveniently control a plurality of the electronic equipments within a situation through a user interface or an external radio telecommunication network.

2. Description of the Prior Art

Digital Home is structured by home network to connect to electronic products such as personal computers, information appliances, multimedia entertainment appliances, and digital television for forming a Connected Home Structure. Home network also integrates external network system to accomplish e-intellectual future life prospects such as home energy management, home security, home care, remote appliance repairing, and digital interactive television through particular Home Gateway.

In order to let consumers break away from the constraints of all kinds of cables and lines, there are many manufacturers who invest in research and development of wireless transmission technology. Presently, the more popular types of short distance wireless technology are Wi-Fi, UWB (Ultra-Wideband), Bluetooth, and the wireless transmission technology which follows IEEE 802.15.4 standard; the most popular of all is IEEE 802.15.4 standard.

However, the usage of the wireless technology which follows IEEE 802.15.4 standard though has the characteristics of saving energy, simple structure, and lower cost, it does not necessarily has more market advantages than the technology of the present invention. The radiation-based signal control technology (such as infrared remote control) used in the present invention is a mature technology generally used in daily life. Moreover, the present invention can avoid the trouble of the electronic equipment manufacturers having to amend current electronic equipments to answer to the above-mentioned wireless transmission standard. Consumers also do not have to replace current electronic equipments with electronic equipments that answer to the wireless transmission standard such as IEEE 802.15.4. Accordingly, the radiation-based signal control technology used in the present invention has much more utility than the wireless transmission technology which follows IEEE 802.15.4. In other words, the Connected Home Structure which is developed by using infrared transmission technology not only can be universally used in each home, but also can be used in all kinds of situations (such as classroom, office, factory, exhibition . . . etc.) which require remote controlling, avoiding the trouble of having to wire all electronic equipments with actual cables.

Accordingly, a scope of the present invention provides a remote controlling system that uses radiation-based signal control for users to conveniently control a plurality of the electronic equipments within a situation through a user interface or an external radio telecommunication network.

SUMMARY OF THE INVENTION

A remote controlling system, according to a preferred embodiment of the present invention, is used for controlling N electronic equipments within a situation, and N is a natural number. Each of the N electronic equipments has a respective radiation-based signal receiver and is capable of operating in accordance with a respective set of first instructions. The remote controlling system includes at least one radiation-based signal transmitter and a processing/controlling apparatus; the radiation-based signal transmitters are distributed in the situation, so as to cover the N radiation-based signal receivers in communication. The processing/controlling apparatus includes a storage device, a user interface, and a processing/controlling unit. The storage device therein stores a look-up table which records M commands and M sets of second instructions; each instruction of the M sets of second instructions correspond to one of the M commands, wherein M is natural number. The user interface enables a user to input one of the commands. The processing/controlling unit, electrically connected to the at least one radiation-based signal transmitter, the storage device, and the user interface respectively, receives the input command, accesses the set of second instructions corresponding to the received command, and controls the at least one radiation-based signal transmitter to emit a set of radiation-based signals; these signals represent the set of second instructions corresponding to the received command. One of the N electronic equipment receives, via the radiation-based signal receiver thereof, the emitted radiation-based signals, converts the received radiation-based signals into the set of second instructions, and judges if one or more of the set of second instructions match the respective set of first instructions; if there is any, it operates in accordance with the matched first instructions.

The advantage and spirit of the invention may be understood by the following recitations together with the appended drawings.

BRIEF DESCRIPTION OF THE APPENDED DRAWINGS

FIG. 2 is an example of the look-up table stored in the storage device.

DETAILED DESCRIPTION OF THE INVENTION

Figure 1:
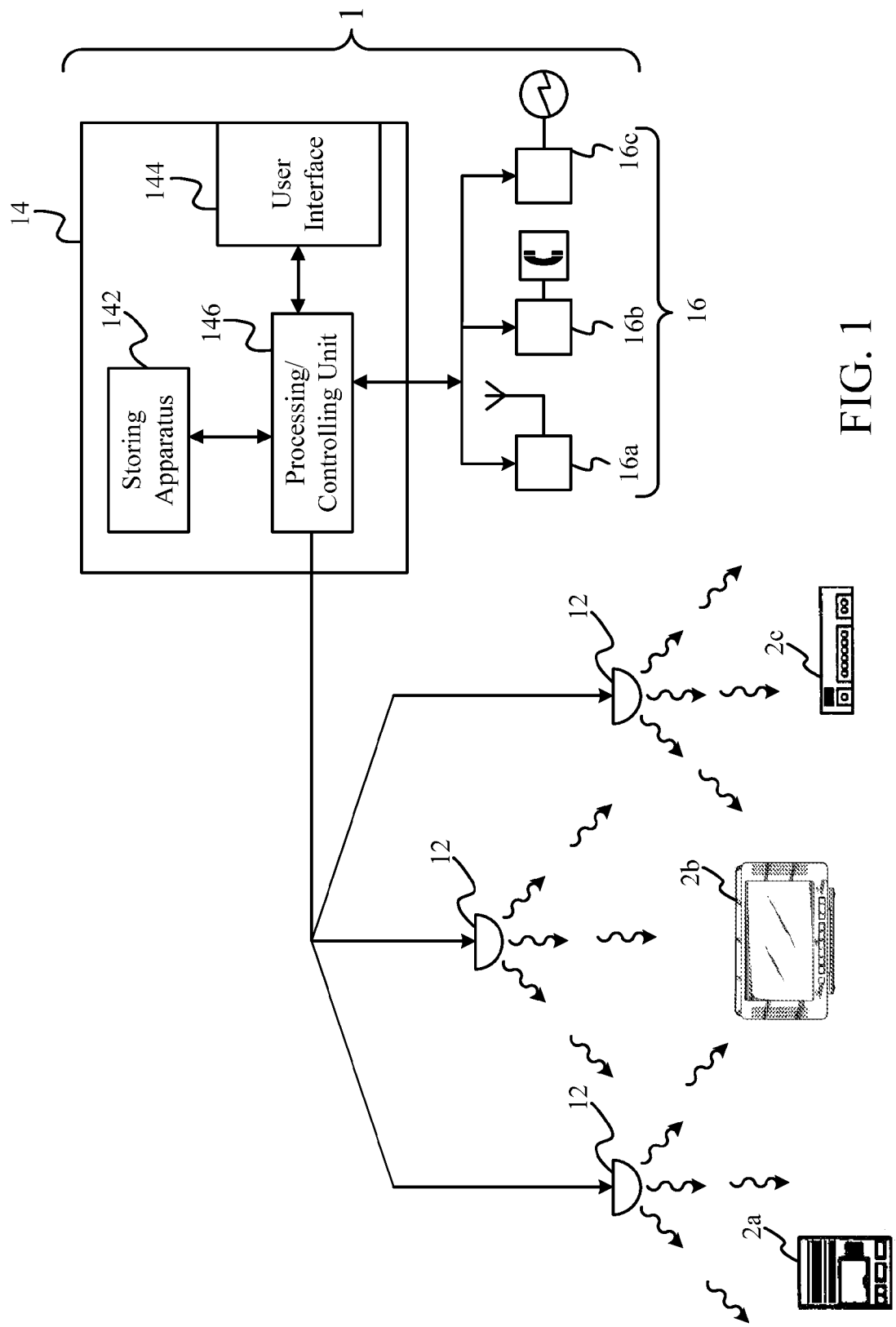
FIG. 1 is a schematic diagram illustrating an infrastructure of a remote controlling system according to the preferred embodiment of the invention.

The present invention provides a remote controlling system that uses radiation-based signal control for users to conveniently control a plurality of electronic equipments within a situation through a user interface or an external radio telecommunication network. The spirit and feature of the present invention will be described in detail by the following preferred embodiments.

Referring to FIG. 1, FIG. 1 is a schematic diagram illustrating an infrastructure of a remote controlling system 1 according to the preferred embodiment of the invention. As shown in FIG. 1, the remote controlling system 1 is used for controlling N electronic equipments 2a-2c within a situation, and N is a natural number. Each of the N electronic equipments 2a-2c includes a respective radiation-based signal receiver (not shown) and is operated in accordance with a respective set of first instructions. The remote controlling system 1 includes at least one radiation-based signal transmitter 12 and a processing/controlling apparatus 14.

The same as shown in FIG. 1, the processing/controlling apparatus 14 includes a storage device 142, a user interface 144, and a processing/controlling unit 146. Particularly, the radiation-based signal transmitters 12 are distributed in the situation for covering N radiation-based signal receivers in communication.

The storage device 142 therein stores a look-up table recording M commands and M sets of second instructions; each set of second instructions corresponds to one of the M commands, wherein M is natural number.

The user interface 144 enables a user to directly input one of the commands. The processing/controlling unit 146 is electrically connected to the at least one radiation-based signal transmitter 12, the storage device 142, and the user interface 144, respectively; the processing/controlling unit 146 receives the inputted command, accesses the set of second instructions corresponding to the received command, and controls the at least one radiation-based signal transmitter 12 to emit a set of radiation-based signals which represent the set of second instructions corresponding to the received command. In practical application, the processing/controlling apparatus 14 can be executed as a computer and can be disposed with a touch panel for users to conveniently operate the user interface 144.

Referring to FIG. 2, FIG. 2 is an example of the look-up table stored in the storage device 142. The look-up table shown in FIG. 2 not only has a command column and an instruction column but also a description column for users to conveniently edit. In one embodiment, the user interface 144 also enables the user to edit the commands and the instructions stored in the storage device 142.

After the at least one radiation-based signal transmitter 12 emits the set of radiation-based signals, one of the N electronic equipments 2a-2c receives, via the radiation-based signal receiver thereof, the emitted radiation-based signals, converts the received radiation-based signals into the set of second instructions, and judges if one or more of the sets of second instructions match the respective set of first instructions; if there is any, it operates in accordance with the matched first instructions.

In one embodiment, the situation can be a home, a classroom, an office, a factory, an exhibition . . . etc.

The same as shown in FIG. 1, for users to not only control within a situation but also remotely control through the user interface 144, the remote controlling system 1 can additionally include at least one communication device for linking an external communication network, such as a radio telecommunication module 16a, a public switched telephone module 16b, and a network module 16c . . . etc. With the above-mentioned communication devices 16, users can remotely input commands without directly operating the user interface 144. The radio telecommunication module 16a can link to a radio telecommunication network. The public switched telephone module 16b can link to a public switched telephone network. The network module 16c can link to a local area network, an intranet, an internet . . . etc.

In one embodiment, each of the emitted radiation-based signals is an infrared, each of the radiation-based signal receivers is an infrared receiver, and each of the at least one radiation-based signal transmitter 12 is an infrared transmitter.

In practical application, as shown in FIG. 1, the at least one radiation-based signal transmitter 12 and extra communication modules (16a~16c) can be advisably cascaded by cables (such as RS485 cable), and they are able to serve as hot-swappable and general plugs (such as USB plug) of computer interface. The look-up table and the user interface 144 can serve as storing medium such as compact disks. Users can conveniently install the look-up table and the user interface 144 into personal computers processing/controlling apparatus) and directly insert the cascaded radiation-based signal transmitters 12 of the communication modules (16a~16c) into the personal computers (processing/controlling apparatus) with the method, and the remote controlling system 1 according to the present invention is completed to control the radiation-based signals to cover the electronic equipments in communication within a certain area. It needs to be noted that the method still needs to combine with USB/RS485 converter modules (not shown in FIG. 1). Besides, the at least one radiation-based signal transmitter 12 cannot cascade with the extra communication modules (16a~16c).

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A remote controlling system for controlling N electronic equipments within a situation, N being a natural number, each of the N electronic equipments comprising a respective radiation-based signal receiver and being operated in accordance with a respective set of first instructions, said remote controlling system comprising:
   a plurality of radiation-based signal transmitters, separately distributed in the situation so as to cover the N radiation-based signal receivers in wireless communication; and
   a processing/controlling apparatus, comprising:
   a storage device therein storing a look-up table recording M commands and M sets of second instructions which each set of second instructions correspond to one of the M commands, M being a natural number;
   a touch panel, for enabling a user to directly input one of the commands; and
   a processing/controlling unit, electrically connected to the radiation-based signal transmitters, the storage device and the touch panel, respectively, for receiving the inputted command, accessing the set of second instructions corresponding to the received command, and controlling the radiation-based signal transmitters to emit a set of radiation-based signals representative of the set of second instructions corresponding to the received command;
   wherein one of the N electronic equipments covered by the radiation-based signal transmitters in wireless communication receives, via the radiation-based signal receiver thereof, the emitted radiation-based signals, converts the received radiation-based signals into the set of second instructions, judges if one or more of the set of second instructions match the respective set of first instructions, and if any, operates in accordance with the matched first instructions.

2. The remote controlling system of claim 1, further comprising a communication device electrically connected to the processing/controlling unit, wherein the communication unit is linked to an external communication network, and enables the user to input one of the commands through the external communication network and the communication unit replacing the touch panel.

3. The remote controlling system of claim 2, wherein the external communication network is one selected from the group consisting of a local area network, an intranet, an internet, a radio telecommunication network, and a public switched telephone network.

4. The remote controlling system of claim 1, wherein each of the emitted radiation-based signals is an infrared, each of the radiation-based signal receivers is an infrared receiver, and each of the radiation-based signal transmitters is an infrared transmitter.

5. The remote controlling system of claim 1, wherein the touch panel also enables the user to edit the commands and the second instructions stored in the storage device.

* * * * *